United States Patent
Henry et al.

(10) Patent No.: US 6,697,937 B1
(45) Date of Patent: Feb. 24, 2004

(54) SPLIT HISTORY TABLES FOR BRANCH PREDICTION

(75) Inventors: G. Glenn Henry, Austin, TX (US); Terry Parks, Austin, TX (US)

(73) Assignee: IP-First, L.L.C., Fremont, CA (US)

( * ) Notice: Subject to any disclaimer, the term of this patent is extended or adjusted under 35 U.S.C. 154(b) by 0 days.

(21) Appl. No.: 10/353,203

(22) Filed: Jan. 28, 2003

Related U.S. Application Data

(63) Continuation of application No. 09/434,096, filed on Nov. 5, 1999, now Pat. No. 6,546,481.

(51) Int. Cl.[7] .............................................. G06F 9/38
(52) U.S. Cl. ..................................... 712/240; 712/239
(58) Field of Search ................................ 712/240, 239

(56) References Cited

U.S. PATENT DOCUMENTS

| | | | | |
|---|---|---|---|---|
| 5,564,118 A | * | 10/1996 | Steely et al. ................. | 712/240 |
| 5,634,119 A | * | 5/1997 | Emma et al. ................. | 712/240 |
| 6,263,427 B1 | * | 7/2001 | Cummins et al. ........... | 712/236 |
| 6,272,623 B1 | * | 8/2001 | Talcott ........................ | 712/239 |
| 6,347,369 B1 | * | 2/2002 | Witt ............................. | 712/240 |
| 6,553,488 B2 | * | 4/2003 | Yeh et al. .................... | 712/239 |
| 6,560,693 B1 | * | 5/2003 | Puzak et al. ................. | 712/207 |

* cited by examiner

*Primary Examiner*—Eric Coleman
(74) *Attorney, Agent, or Firm*—Richard K. Huffman; James W. Huffman

(57) ABSTRACT

An apparatus and method are provided for accurately predicting the outcome of branch instructions prior to their execution by a pipeline microprocessor. The apparatus includes a first table, a second table, and selection logic. The first table stores branch histories for a first set of branch instructions where the first branch instructions are categorized within the first table according to a first outcome bias. The second table stores branch histories for a second set of branch instructions, where the second branch instructions are categorized within the second table according to a second outcome bias. The selection logic is coupled to the first and second tables. When a branch instruction is executed by the microprocessor, the selection logic selects a particular branch history to predict the outcome of the branch instruction. Thus, a branch prediction is made based upon contents of a branch history that is selected from a table containing branch histories for other branch instructions that are categorized according to similar outcome bias, thereby reducing the negative effects of aliasing.

30 Claims, 6 Drawing Sheets

FIG. 3 (Related Art)

Branch Predictions for Aliased Branch Instructions Having Conflicting Outcome Biases 300

| Time | Instruction | Outcome Bias | BHT Pred | Rslvd Outcome | Effect | BHT Update |
|---|---|---|---|---|---|---|
| T1 | JNS | T | T | T | NONE | T |
| T2 | JZ | NT | T | NT | FLUSH | NT |
| T3 | JZ | NT | NT | NT | NONE | NT |
| T4 | JNS | T | NT | T | FLUSH | T |

T4 flush influenced by resolved outcome of previously executed JZ instruction

T2 flush influenced by resolved outcome of previously executed JNS instruction

FIG. 4

Observed Branch Instruction Outcome Bias in Predominant Desktop Applications 400

| Instruction | Percentage Taken (%) |
|---|---|
| JO | 0.00 |
| JNO | 100.00 |
| JC | 45.08 |
| JNC | 31.94 |
| JZ | 35.60 |
| JNZ | 47.99 |
| J(C|Z) | 62.58 |
| JN(C|Z) | 31.58 |
| JS | 30.90 |
| JNS | 86.15 |
| JP | 0.00 |
| JNP | 0.00 |
| J(S^O) | 33.91 |
| JN(S^O) | 59.34 |
| J(S^O)|Z | 33.88 |
| JN(S^O)|Z | 57.25 |
| JCXZ | 29.51 |

*Branch Predictions According to Split Branch History Tables*

| Time | Instruction | Bias Indication | BHT Pred | Rslvd Outcome | Effect | BHT Update |
|------|-------------|-----------------|----------|---------------|--------|------------|
| T1 | JNS | T | T (T Table) | T | NONE | T (T Table) |
| T2 | JZ | NT | NT (NT Table) | NT | NONE | NT (NT Table) |
| T3 | JZ | NT | NT (NT Table) | NT | NONE | NT (NT Table) |
| T4 | JNS | T | T (T Table) | T | NONE | T (T Table) | accurate predictions provided via separate history tables

SPLIT HISTORY TABLES FOR BRANCH PREDICTION

CROSS-REFERENCE TO RELATED APPLICATIONS

This application is a continuation of co-pending U.S. patent application Ser. No. 09/434,096, now U.S. Pat. No. 6,546,481, entitled SPLIT HISTORY TABLES FOR BRANCH PREDICTION, having a common assignee and common inventors, and filed on Nov. 5, 1999.

This application is related to the following U.S. Pat. No. 6,499,101, entitled STATIC BRANCH PREDICTION MECHANISM FOR CONDITIONAL BRANCH INSTRUCTIONS; U.S. Pat. No. 6,189,091, entitled APPARATUS AND METHOD FOR SPECULATIVELY UPDATING GLOBAL BRANCH HISTORY AND RESTORING SAME UPON BRANCH MISPREDICTION DETECTION; U.S. Pat. No. 6,230,261, entitled METHOD AND APPARATUS FOR PREDICTING CONDITIONAL BRANCH INSTRUCTION OUTCOME BASED ON BRANCH CONDITION TEST TYPE; and U.S. Pat. No. 6,247,122, entitled METHOD AND APPARATUS FOR PERFORMING BRANCH PREDICTION COMBINING STATIC AND DYNAMIC BRANCH PREDICTORS.

This application is related to the following co-pending U.S. patent applications: Ser. No. 09/825435, now U.S. Pat. No. 6,571,316 entitled STATIC BRANCH PREDICTION MECHANISM FOR CONDITIONAL BRANCH INSTRUCTIONS; Ser. No. 10/195083, entitled SPLIT HISTORY TABLES FOR BRANCH PREDICTION; and Ser. No. 09/690371, entitled APPARATUS AND METHOD FOR SPECULATIVELY UPDATING GLOBAL BRANCH HISTORY WITH BRANCH PREDICTION PRIOR TO RESOLUTION OF BRANCH OUTCOME. All of the aforementioned applications have the same assignee and were filed prior to this application.

BACKGROUND OF THE INVENTION

1. Field of the Invention

This invention relates in general to the field of instruction execution in computers, and more particularly to an apparatus and method for predicting the outcome of branch instructions in a pipeline microprocessor.

2. Description of the Related Art

An application program for execution on a microprocessor consists of a structured series of macro instructions that are stored in sequential locations in memory. A current instruction pointer within the microprocessor points to the address of the instruction currently being executed and a next instruction pointer within the microprocessor points to the address of the next instruction for execution. During each clock cycle, the length of the current instruction is added to the contents of the current instruction pointer to form a pointer to a next sequential instruction in memory. The pointer to the next sequential instruction is provided to logic that updates the next instruction pointer. If the logic determines that the next sequential instruction is indeed required for execution, then the next instruction pointer is updated with the pointer to the next sequential instruction in memory. Thus, macro instructions are fetched from memory in sequence for execution by the microprocessor.

obviously, because a microprocessor is designed to execute instructions from memory in the sequence that they are stored, it follows that a program configured to execute macro instructions sequentially from memory is one that will run efficiently on the microprocessor. For this reason, most application programs are designed to minimize the number of instances where macro instructions are executed out of sequence. These out-of-sequence instances are known as jumps, or branches.

A program branch presents a problem because most conventional microprocessors do not simply execute one instruction at a time. Rather, a present day microprocessor consists of a number of pipeline stages, each stage performing a specific function. Instructions, inputs, and results from one stage to the next are passed in synchronization with a pipeline clock. Hence, several instructions may be executing in different stages of the microprocessor pipeline within the same clock cycle. Consequently, when logic within a given stage determines that a program branch is to occur, then instructions in previous stages of the pipeline must be cast out so that control of the microprocessor can be transferred to the instruction directed by the branch, or the branch target instruction. This casting out of instructions in previous pipeline stages is known as flushing the pipeline.

A conditional branch is a branch that may or may not occur, depending upon an evaluation of some specified condition. And this evaluation is typically performed in later stages of the microprocessor pipeline. To preclude wasting many clock cycles associated with flushing and refilling the pipeline, present day microprocessors also provide logic in an early pipeline stage that predicts whether a conditional branch will occur or not, that is, whether it will be taken or not taken. If it is predicted that a conditional branch will be taken, then only those instructions prior to the early pipeline stage must be flushed, including those in the instruction buffer. Even so, this is a drastic improvement; correctly predicted branches are executed in roughly two clock cycles. But an incorrect prediction takes many more cycles to execute than if no branch prediction mechanism had been provided in the first place. The accuracy of branch predictions in a pipeline processor significantly impact the processor's performance, for better or worse.

Present day branch prediction mechanisms primarily predict the outcome of a given conditional branch instruction in an application program based upon outcomes obtained when the conditional branch instruction was previously executed within the same instance of the application program. This historical branch prediction, or dynamic branch prediction, is effective because conditional branch instructions tend to exhibit repetitive outcome patterns.

In a conventional microprocessor, the historical outcome data is stored in a single branch history table that is accessed using the address of a conditional branch instruction a unique identifier for the instruction. A corresponding entry in the branch history table contains the historical outcome data associated with the conditional branch instruction. A dynamic prediction of the outcome of the conditional branch instruction is made based upon the contents of the corresponding entry in the branch history table.

Yet, because most present day microprocessors have address ranges on the order of gigabytes, it is not practical for a branch history table to be as large as the microprocessor's address range. Because of this, smaller branch history tables are provided, on the order of kilobytes, and only the low-order bits of a conditional branch instruction's address are used as an index into the table. But this presents another problem: because low-order address bits are used to index the branch history table, two or more conditional branch instructions can index the same entry. This is known as aliasing. As such, the outcome of a more recently executed conditional branch instruction will influence the historical outcome record of a formerly executed conditional branch instruction that is aliased to the same table entry. If the former conditional branch instruction is encountered again, its historical outcome information is biased, for better or for worse, toward the outcome of the more recently executed conditional branch instruction.

The present inventors have observed that the outcomes of conditional branch instructions, when observed on pipeline microprocessor executing today's predominant desktop computer application programs exhibit a bias toward one outcome or the other as a function of static indicators such as the type of conditional test performed, regardless of historical outcome data associated with the instructions. Some conditional branch instructions indeed exhibit a very strong bias toward an outcome, virtually independent of execution history in the application program. Thus, execution of an application program is negatively impacted when it has a significant number of conditional branch instructions having conflicting outcome biases that are aliased to the same historical outcome records: predictions for instructions biased toward being taken are negatively influenced by instructions that are biased toward being not taken that are aliased to the same historical outcome record, and vice versa.

Thus, the accuracy of branch predictions is degraded on the whole in a microprocessor that allows the outcomes of conditional branch instructions exhibiting a certain outcome bias to impact the historical outcome data for conditional branch instructions that exhibit a conflicting outcome bias.

Therefore, what is needed is an apparatus for predicting the outcomes of branch instructions that is more accurate than has heretofore been provided.

In addition, what is needed is a branch prediction mechanism in a microprocessor that separately maintains historical outcome records for conditional branch instructions as categorized by outcome bias.

Furthermore, what is needed is an apparatus in a microprocessor for predicting branches that precludes outcomes associated with conditional branch instructions having a certain outcome bias from influencing branch predictions for other branch instructions that exhibit a bias toward a different outcome.

Moreover, what is needed is a method for separating historical outcome data for conditional branch instructions that improves the accuracy of their associated branch predictions.

SUMMARY OF THE INVENTION

To address the above-detailed deficiencies, it is an object of the present invention to provide a branch prediction apparatus that provides accurate branch predictions by segregating outcome records for conditional branch instructions according to their observed outcome bias.

Accordingly, in the attainment of the aforementioned object, it is a feature of the present invention to provide a branch prediction apparatus. The branch prediction apparatus includes a first table, a second table, and selection logic. The first table stores first branch histories for a first set of branch instructions, where the first branch instructions are categorized within the first table according to a first outcome bias. The second table stores second branch histories for a second set of branch instructions, where the second branch instructions are categorized within the second table according to a second outcome bias. The selection logic is coupled to the first and second tables. The selection logic selects a particular branch history from either of said first or second tables.

In an additional aspect, it is a feature of the present invention to provide an apparatus in a microprocessor for performing branch prediction. The apparatus includes a bias indicator, a dynamic branch predictor, and a plurality of branch history tables. The bias indicator receives a branch instruction from an instruction buffer and provides an output indicating a particular outcome bias category for the branch instruction. The dynamic branch predictor is coupled to the bias indicator. The dynamic branch predictor receives the output and predicts an outcome for the branch instruction based upon contents of an entry in a particular branch history table, where the particular branch history table corresponds to the particular outcome bias category. The plurality of branch history tables is coupled to the dynamic branch predictor. Each of the plurality of branch history tables corresponds to each of a plurality of outcome bias categories, where the particular branch history table is one of the plurality of branch history tables, and where the particular outcome bias category is one of the plurality of outcome bias categories.

An advantage of the present invention is that more accurate branch predictions are generated in a microprocessor than have heretofore been obtained.

Another object of the present invention is to an apparatus in a microprocessor to predict branch outcomes for conditional branch instructions exhibiting a particular outcome bias based upon historical outcome data for conditional branch instructions that exhibit the same particular outcome bias.

In another aspect, it is a feature of the present invention to provide a branch prediction mechanism for performing branch predictions in a microprocessor. The branch prediction mechanism has a bias indicator, a dynamic branch predictor, and branch history update logic. The bias indicator receives a branch instruction from an instruction buffer, and provides an output indicating a particular outcome bias category for the branch instruction. The particular outcome bias category is one of a plurality of outcome bias categories. The dynamic branch predictor is coupled to the bias indicator. The dynamic branch predictor receives the output, and predicts an outcome for the branch instruction based upon contents of an entry in a particular branch history table, where the particular branch history table is one of a plurality of branch history tables, and where the particular branch history table corresponds to the particular outcome bias category. The particular outcome bias category is defined based upon useful criteria to support more accurate dynamic branch predictions. The branch history update logic is coupled to the dynamic branch predictor. The branch history logic updates the entry following resolution of the branch instruction.

Another advantage of the present invention is that execution speed of an application program is improved because unnecessary pipeline flushes due to incorrect branch predictions are reduced.

A further object of the invention is to provide an apparatus in a microprocessor for predicting branches that precludes outcomes associated with conditional branch instructions having a certain outcome bias from influencing branch predictions for other branch instructions that exhibit a bias toward a different outcome.

In a further aspect, it is a feature of the present invention to provide a branch prediction apparatus. The branch prediction apparatus includes a bias indicator and a dynamic branch predictor. The bias indicator provides an output indicating a particular outcome bias category for a particular branch instruction. The dynamic branch predictor is coupled to the bias indicator and directs a next instruction pointer to indicate a next sequential instruction address or a branch target address. The dynamic branch predictor has a plurality of branch history tables. Each of the plurality of branch history tables receives an instruction pointer and maintains corresponding branch outcome data, where a particular branch history table contains particular branch outcome data associated with the particular outcome bias category. The particular outcome bias category is established to support more accurate dynamic branch predictions in the presence of aliasing.

A further advantage of the present invention is that application programs having significant numbers of program branches execute more efficiently.

Yet another object of the present invention is to provide a method for separating historical outcome data for conditional branch instructions that improves the accuracy of their associated branch predictions.

In yet another aspect, it is a feature of the present invention to provide a method for performing branch prediction in a microprocessor. The method includes maintaining a plurality of branch history tables containing historical outcome records for branch instructions, each of the plurality of branch history tables being indexed by an instruction pointer; employing a specific outcome bias category to identify a specific branch history table for a specific branch instruction, where the specific outcome bias category is defined based upon criteria to support more accurate branch predictions; and predicting an outcome of the specific branch instruction based upon contents of a specific historical outcome record corresponding to the specific outcome bias category.

Yet another advantage of the present invention is that a method is provided to reduce the confusion created in a branch history table by intermixing results of conditional branch instructions having a given outcome bias with results of conditional branch instructions having a conflicting outcome bias.

BRIEF DESCRIPTION OF THE DRAWINGS

These and other objects, features, and advantages of the present invention will become better understood with regard to the following description, and accompanying drawings where:

FIG. 3 is a table illustrating the effects of predicting branches for aliased branch instructions with the microprocessor of FIG. 2.

FIG. 4 is a table presenting branch instruction outcomes as observed in predominant desktop application programs.

DETAILED DESCRIPTION

In light of the above background on techniques for predicting the outcome of a branch instruction in a pipeline microprocessor, several related art examples will now be discussed with reference to FIGS. 1 through 3. These examples illustrate the problematic nature of present day branch prediction techniques, in particular when these present day techniques are employed during the execution of application programs in a desktop computer. Following this discussion, a detailed description of the present invention will be provided with reference to FIGS. 4 through 7. Use of the present invention provides more accurate branch outcome predictions than those obtained via conventional techniques, thus allowing desktop computer applications to run faster than has been previously achieved.

Figure 1:
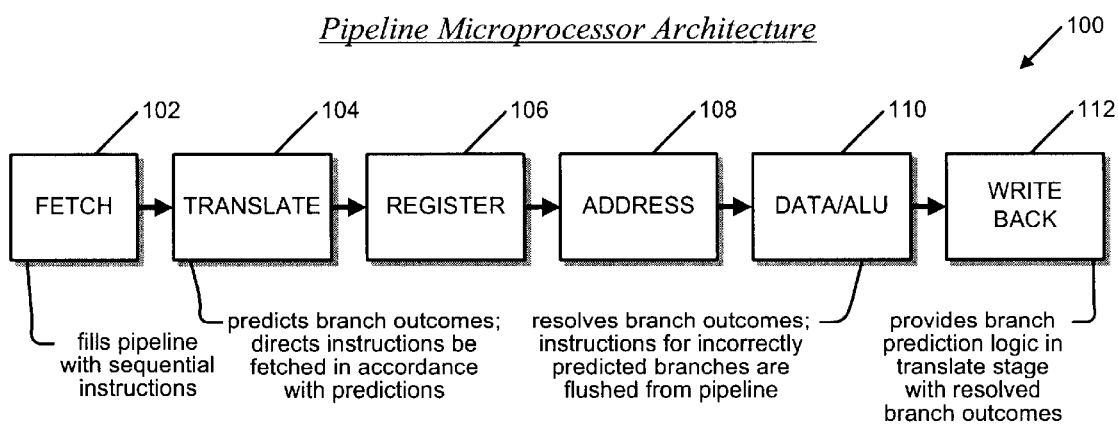
FIG. 1 is a block diagram of a related art pipeline microprocessor.

Referring to FIG. 1, a block diagram is presented of a related art pipeline microprocessor 100. The microprocessor 100 includes a fetch stage 102, translate stage 104, register stage 106, address stage 108, data/ALU stage 110, and write back stage 112.

Operationally, the fetch stage 102 fetches instructions from memory (not shown) that are to be executed by the microprocessor 100. The translate stage 104 translates, or decodes, the fetched instructions into associated micro instructions, each micro instruction directing the microprocessor 100 to perform a specific subtask related to accomplishment of an overall operation prescribed by a fetched macro instruction. The register stage 106 retrieves operands specified by the micro instructions from a register file (not shown) for use by later stages in the pipeline. The address stage 108 calculates memory addresses specified by the micro instructions to be used in data storage and retrieval operations. The data/ALU stage 110 either performs arithmetic logic unit (ALU) operations on data retrieved from the register file, or reads/writes data from/to memory using the memory address calculated in the address stage 108. The write back stage 112 writes the result of a data read operation, or an ALU operation, to the register file. Thus, macro instructions are fetched by the fetch stage 102 and are decoded into micro instructions by the translate stage 104, and the micro instructions proceed through subsequent stages 106–112 for execution.

Micro instructions move through successive stages of the microprocessor pipeline in synchronization with a microprocessor clock. Optimally, while any given stage in the pipeline is executing a micro instruction, the previous stage should be executing the next micro instruction. If a stage in the pipeline requires more than one cycle of the pipeline clock to execute a given micro instruction, flow of micro instructions through the microprocessor pipeline is effectively stalled: preceding stages in the pipeline are precluded from forwarding associated results down the pipeline and succeeding stages, having completed execution of a current micro instruction, sit idle. A stall in the pipeline is referred to as a slip, or a void. Slips are unwanted because they cause delays. In the absence of techniques to diminish the negative effects of slips, it follows then that the speed at which the microprocessor 100 executes a particular application program is significantly influenced by the number of pipeline slips that are encountered during its execution. For this reason, present day microprocessors employ various techniques to minimize the number of pipeline voids. One such technique, branch prediction, is described with reference to FIG. 2.

Figure 2:
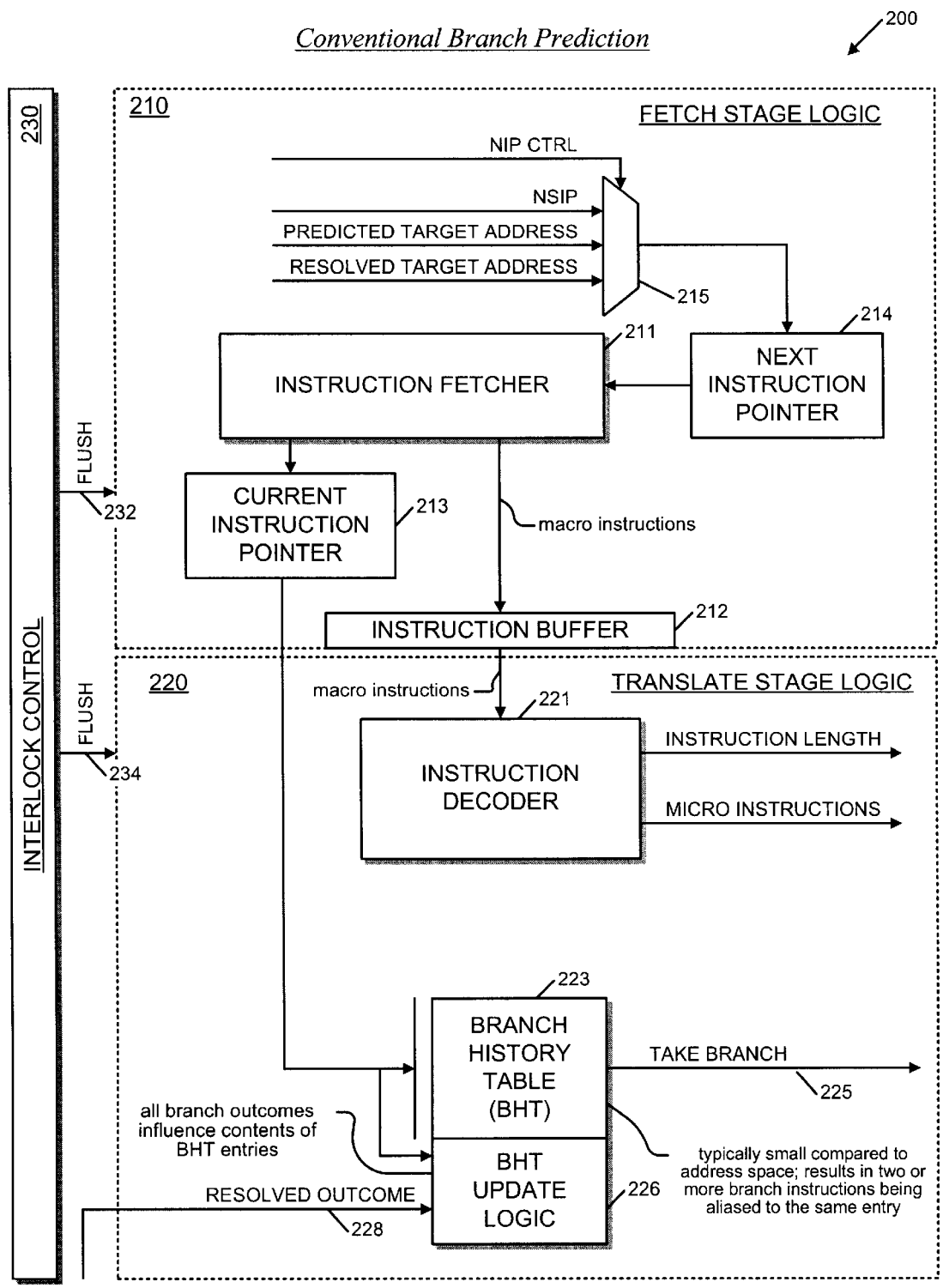
FIG. 2 is a block diagram of a portion of a related art pipeline microprocessor illustrating conventional apparatus for predicting the outcome of branch instructions.

Referring to FIG. 2, a block diagram of a portion of a related art pipeline microprocessor 200 is presented illustrating conventional mechanisms for predicting the outcome of branch instructions. The microprocessor 200 includes fetch stage logic 210, translate stage logic 220, and interlock control 230. For clarity of discussion, remaining stages of the microprocessor 200 are not shown.

The fetch stage logic 210 has an instruction fetcher 211 that provides sequential macro instructions to an instruction buffer 212 so that the sequential macro instructions are available for retrieval by the translate stage logic 220 during each clock cycle.

The translate stage logic 220 has an instruction decoder 221, or translator 221, that receives macro instructions provided by the instruction buffer 212. The translate stage logic 220 also includes a branch history table (BHT) 223 which provides a take branch output signal 225.

The interlock control 230 spans the fetch and translate stages of the microprocessor 200. The interlock control 230 interfaces to the fetch stage logic 210 via flush signal 232. Interface to the translate stage logic 220 is achieved via flush signal 234.

operationally, a sequential block of macro instructions is retrieved by the instruction fetcher 211 from external memory (not shown) or an instruction cache (not shown) and the macro instructions are provided to the instruction buffer 212. The instruction buffer 212 stores several sequential macro instructions that are designated for execution. During each cycle of the pipeline clock, a macro instruction is retrieved from the instruction buffer 212 and is provided to the instruction decoder 221 for translation into associated micro instructions for execution by succeeding stages of the microprocessor 200.

Application programs chiefly execute macro instructions sequentially. That is, execution of a first macro instruction stored in a first address in memory is followed by execution of a second macro instruction stored in a second address. The second address is offset from the first address in memory by a number of bytes, L, where L is the number of bytes required to store the first macro instruction. The number of bytes, L, is also called the length of an instruction. Execution of the second macro instruction is followed by execution of a third macro instruction stored in a third address that follows the second address, and so on.

In addition, a macro instruction is uniquely identified by its corresponding location in memory. The corresponding location of the macro instruction provided each cycle for translation is designated by a current instruction pointer 213. Because macro instructions vary in size, the instruction decoder 221 provides an instruction length output to be used by the fetch stage logic 210 to determine the address of a next sequential instruction. A sum of the current instruction pointer and the current instruction length designates the location of the next sequential instruction, or next sequential instruction pointer (NSIP). The NSIP is one of the inputs provided to a mux 215 in the fetch stage logic 210. If it is determined that the next instruction to be executed is the next sequential instruction, then a next instruction pointer (NIP) control (CTRL) signal directs the mux 215 to provide the NSIP to a next instruction pointer 214. The instruction fetcher 211 fetches macro instructions based upon the contents of the next instruction pointer 214. Hence, macro instructions continue to execute sequentially until a program control transfer instruction is executed.

A program control transfer instruction performs the function that its name implies: sequential instruction execution is temporarily halted and control of the microprocessor 200 is transferred to another area of the application program where, most likely, sequential execution of macro instructions will continue. There are two basic types of program control transfer instructions. One type unconditionally causes program control flow to be transferred to a different area of memory. Instructions of this type are known as unconditional control transfer instructions, unconditional jump instructions, unconditional branch instructions, or call/return instructions. The other type of program control transfer instructions transfers program control flow to a different area of memory as a result of some condition being met. Instructions of this type are known as conditional program control transfer instructions, conditional jump instructions, or conditional branch instructions.

A conditional branch instruction is a commonly used program control transfer instruction. For example, a program operating at location X in memory may test an input to the microprocessor 200. If the input satisfies some condition as prescribed by the particular conditional jump instruction being employed, then program control is transferred to location Y. Else, program execution continues to a next sequential macro instruction that follows location X.

Conditional jump micro instructions are evaluated, or resolved, in the data/ALU stage of the microprocessor 200. Yet, by the time a conditional jump micro instruction proceeds through the data/ALU stage, a next sequential micro instruction is present in the address stage, a micro instruction following the next sequential micro instruction is in the register stage, and so forth. Moreover, because the presumption is that sequential instruction execution will continue following evaluation of the conditional jump micro instruction, in the absence of branch prediction mechanisms, the instruction buffer 212 would also be filled with macro instructions that sequentially follow the conditional jump instruction.

If the evaluation of the condition specified by the conditional branch instruction does not result in the jump, or branch, being taken, then sequential instruction execution continues uninterrupted. If, on the other hand, the condition evaluation results in the branch being taken, then, because sequential instructions have been queued up for execution, several clock cycles are consumed with casting out, or flushing, the undesired sequential instructions from the pipeline and the instruction buffer 212 and thereafter filling the pipeline with sequential instructions beginning with the instruction that is the target of the conditional branch. Such an instruction is called a branch target instruction, or branch target. Resolution of the conditional branch instruction in the data/ALU stage also results in the location of the branch target instruction, or resolved target address, being definitively provided to the mux 215. When resolution of a conditional branch causes the branch to be taken, the NIP CTRL signal causes the resolved target address to be provided to the next instruction pointer 214 so the instruction fetcher 211 can begin fetching sequential instructions from the resolved target address.

To recap, a conditional branch instruction is evaluated in the data/ALU stage. If a condition specified by the instruction is not met, then program control continues to the next sequential instruction. If the condition is met, then program control is transferred to the branch target instruction. To execute the branch, the pipeline must be flushed prior to fetching the branch target instruction. The interlock control 230 asserts the flush signals 232, 234 to accomplish the flush of the fetch stage logic 210 and translate stage logic 220. Following the flush, the pipeline is refilled with sequential instructions beginning with the branch target.

Branch prediction techniques are utilized in the microprocessor 200 to minimize the number of clock cycles that are wasted when a conditional branch is taken. In the translate stage, the branch history table 223 maintains an historical record of the outcomes of previously executed conditional jump instructions so that future outcomes of the conditional jump instructions can be predicted. It is well understood in the art that the outcome of a particular branch instruction executed at a particular instant in an application program is highly correlated to previous outcomes of the particular branch instruction in the application program and to the outcomes of more recently executed branch instructions by the application program. Hence, by evaluating the historical record of the particular jump instruction in the branch history table 223, the translate stage logic can provide an accurate prediction of its outcome at the particular instant.

Recall that the contents of the current instruction pointer 213 uniquely identify an instruction that is being executed. Thus, to access a historical record, or entry, the current instruction pointer (CIP) 213 is provided to the branch history table 223. In principle, the entry corresponding to a particular CIP value can be evaluated and an accurate prediction for an associated branch instruction can be provided via the take branch output signal 225.

However, to maintain a one-to-one correspondence between all locations in memory (i.e., potential locations for conditional branch instructions) and corresponding branch history table entries would require that the branch history table 223 be equal in address range to the memory. This is simply not feasible in a present day microprocessor 200 having an address range on the order of gigabytes. As a compromise then, various N:1 mapping schemes are employed to balance the functional and performance requirements of branch prediction with the size, complexity, and power requirements of the branch history table 223. One common approach uses low-order bits of the CIP 213 to index entries in a branch history table 223 that is on the order of kilobytes in size. Several mapping schemes of this type are specifically discussed in copending U.S. patent application Ser. No. 09/203844, now U.S. Pat. No. 6,189,091, entitled METHOD AND APPARATUS FOR SPECULATIVELY UPDATING GLOBAL BRANCH HISTORY, having common inventors and having the same assignee, which is hereby incorporated by reference.

The low-order bits of the CIP 213 are used to access a particular branch history table entry to predict, based upon previous executions of a corresponding branch instruction, whether it is probable that execution of the corresponding conditional branch instruction will result in a branch being taken or not being taken. If the particular branch history table entry indicates that the branch will be taken, then the take branch output signal 225 is asserted. If the particular branch history table entry indicates that the branch will not be taken, then the take branch output signal 225 is not asserted. Because the branch prediction is based upon previous executions of the corresponding branch instruction during execution of an application program, it is referred to as a dynamic prediction.

Yet, because only the low-order address bits of the CIP 213 are used to index into the branch history table 223, it is noted that more than one conditional branch instruction can be mapped to the same branch history table entry. This phenomenon is called aliasing. More specifically, a given branch history table entry may be associated with the outcomes of two or more conditional branch instructions having the same low-order address. If a dynamic prediction is made for one of the conditional branch instructions, the branch history table entry to which it is mapped may reflect the outcomes of other branch instructions that are also mapped to the same entry. Therein lies the balance: a cheaper, less-complex branch history table 223 is obtained at the expense of aliasing. Aliasing produces less than accurate branch predictions for a given branch instruction because its corresponding branch history table entry may also be influenced by outcomes of other, uncorrelated conditional branch instructions.

Once a branch prediction is made, the take branch output signal 225 directs the microprocessor either to speculatively take a corresponding branch to a branch target instruction or to continue execution of sequential instructions. If the branch is predicted to be taken, the translate stage logic 220 also provides a predicted target address indicating the location in memory for the branch target instruction. The predicted target address is provided to the mux 215. For execution of a speculative branch, i.e., a branch that is predicted taken, the NIP CTRL signal directs the mux 215 to provide the predicted target address to the next instruction pointer 214.

It is significant that the branch prediction, because it is made in the translate stage, cannot deterministically indicate whether or not a branch will be taken or not. This is because the associated branch condition is not evaluated until the data/ALU stage. For this reason a branch that is predicted to be taken by the translate stage logic 220 is called a speculative branch.

One skilled in the art will appreciate that different microprocessors utilize different macro instructions to implement conditional branches. Also, as is alluded to above, there are several different techniques used to speculate whether a conditional branch will be taken or not. Furthermore, one skilled will understand that that methods for providing a branch target address vary. A comprehensive discussion of conventional branch prediction methodologies is beyond the scope of this application. It suffices to note that most present day microprocessors employ some form of branch prediction logic in the translate stage to minimize the number of clock cycles that are associated with performing a conditional branch.

If a conditional branch is predicted to be taken, then the take branch output signal 225 and target address are provided to the fetch stage logic. 210. As a result, the fetch stage logic 210 flushes the contents of the instruction buffer 212 and begins fetching sequential instructions from the predicted target address. If the conditional branch is predicted not taken, then sequential instructions following the conditional branch instruction are allowed to proceed through the pipeline.

As a conditional branch instruction proceeds through the data/ALU stage, its associated condition is evaluated and a result of the evaluation determines the true outcome of the conditional branch instruction. The true outcome is also known as a resolved outcome. The resolved outcome of a conditional branch instruction is fed back to BHT update logic 226 via bus 228 so that the resolved outcome can be added to the historical outcome data in the branch history table entry to which the conditional branch instruction was mapped. The BHT update logic 226 updates the branch history table entry associated with the resolved outcome.

In addition to providing historical outcome data, it is equally important to note that resolution of the conditional branch instruction either confirms or contradicts the prediction provided by translate stage logic 220. Correctly predicting that a conditional branch will occur typically allows a conditional jump instruction to be executed in only two clock cycles: one cycle to flush the instruction buffer 212 and one cycle to fill it 212 with macro instructions beginning with a branch target instruction at the predicted target address. On the contrary, incorrectly predicting a conditional jump requires more cycles to execute than would have been required if no branch prediction technique had been used in the first place: A 1-cycle penalty is required to flush early stages in the microprocessor 200 in order to begin fetching at the predicted target address as a result of the speculative branch being directed by the branch prediction signal 225. Then, when resolution of the conditional branch instruction contradicts the prediction, the pipeline stages must be flushed again, this time up to the data/ALU stage. Further delay is required to refill the pipeline with the correct instructions. Because the delays caused by an inaccurate branch prediction are worse than the delays incurred in the absence of any prediction at all, it is extremely important that a branch prediction be accurate. Accurate branch predictions can result in significant performance gains. On the other hand, inaccurate branch predictions gravely impact the performance of the microprocessor 200.

Aliasing diminishes the accuracy of branch predictions. For instance, if a given branch history table entry contains historical outcome data corresponding to two aliased conditional branch instructions, a first instruction exhibiting a bias toward being taken and a second instruction exhibiting a bias toward being not taken, then a dynamic prediction for either instruction based upon the resolved outcomes of the other instruction would be inaccurate. One skilled in the art will observe that the tendencies, or biases, of conditional branch instructions toward being taken or not taken contribute to the overall accuracy of branch predictions in the microprocessor 200. How these tendencies negatively impact the performance of a microprocessor 200 having conventional branch prediction mechanisms is more specifically discussed with reference to FIG. 3.

Referring to FIG. 3, a table 300 is provided illustrating the effects of predicting branches with the microprocessor 200 of FIG. 2. The table traces the execution of two x86-compatible conditional branch instructions: jump if sign flag not set, designated by JNS, and jump if zero flag set, designated by JZ. The JNS instruction has been observed to exhibit a bias toward being taken. The JZ instruction exhibits a bias toward being not taken. The sign flag and the zero flag refer to bits in a flags register in the x86-compatible microprocessor 200 that reflect the result of a previously executed arithmetic operation. Execution of the instructions are traced with respect to times T1 through T4, time T4 being later than time T1. Contents of the column entitled BHT Pred denote the output 225 of the branch history table 223, contents of the column entitled Rslvd Outcome denote the resolved outcome of the conditional branch instruction, contents of the column entitled Effect portray the effect of the resolved outcome in view of the action directed by the output 225, and contents of the column entitled BHT Update denote the how the branch history table 223 is updated as a result of the conditional branch instruction being resolved.

At time T1, conditional branch instruction JNS is provided to the translate stage logic 220. The low-order bits of the CIP 213 are used to access a corresponding branch history table entry for the JNS instruction. The branch history table 223 provides a dynamic branch prediction of taken (T) via the take branch output signal 225. Thus, the microprocessor 200 is directed to take a speculative branch to a branch target instruction associated with the JNS instruction. Resolution of the JNS instruction prior to time T2 confirms the branch prediction. Following resolution of the JZ instruction, the resolved outcome, taken (T), is provided to the BHT update logic 226 so that the branch history table entry corresponding to JNS can reflect the recent outcome. In the branch prediction scheme used in this example, such an update will result in a dynamic branch prediction of taken (T) the next time the corresponding branch history table entry is accessed. In an alternative embodiment, the BHT update logic 226 is speculatively updated prior to resolution of the JZ instruction, so that subsequent references will be accurately predicted.

At time T2, conditional branch instruction JZ is provided to the translate stage logic 220. And although the JZ instruction resides at a different address in memory than the JNS instruction, its low-order address is the same as that for the JNS instruction. Hence, the JZ instruction aliases into the same entry in the branch history table 223 as the JNS instruction. As a result, the branch history table 223 provides a dynamic branch prediction of taken (T) via the take branch output signal 225. Thus, the microprocessor 200 is directed to take a speculative branch to a branch target instruction prescribed by the JZ instruction. Yet, resolution of the JZ instruction prior to time T3 contradicts the branch prediction. The effect is that the microprocessor pipeline must be flushed and refilled with instructions beginning with the next sequential instruction following the JZ instruction. Following resolution of the JZ instruction, the resolved outcome, not taken (NT), is provided to the BHT update logic 226 so that the corresponding branch history table entry for the JZ instruction will reflect the recent outcome.

At time T3, conditional branch instruction JZ is again provided to the translate stage logic 220. Its corresponding entry in the branch history table 223 is accessed, and because the entry contents indicate that the branch will be not taken, the take branch output signal 225 is not asserted. Consequently, the microprocessor 200 is directed to continue execution of sequential instructions. Resolution of the JZ instruction prior to time T4 confirms the previous prediction and there is thus no detrimental effect on microprocessor performance. Following resolution of the JZ instruction, the resolved outcome, NT, is provided to the BHT update logic 226. The BHT update logic 226 updates the corresponding branch history table entry with the resolved outcome, NT.

At time T4, conditional branch instruction JNS is provided again to the translate stage logic 220. This time, because contents of the aliased branch history table entry reflect the outcome of the previously executed JZ instruction, the take branch output signal 225 is not asserted, indicating a not taken prediction. Hence, the microprocessor 200 continues execution of sequential instructions. Yet, when the JNS instruction is resolved, the not taken prediction is contradicted and the pipeline must be flushed and refilled with instructions beginning with the target instruction prescribed by the JNS instruction.

It is significant to note that the accuracy of the prediction for either of the two conditional branch instructions is negatively influenced by virtue of the presence of historical outcome data corresponding to the other conditional branch instruction. When the JZ instruction is fetched during time T2, its corresponding branch history table entry contains data pertaining to the execution of the JNS instruction during time T1. When the JNS instruction is fetched during time T4, its corresponding branch history table entry contains data pertaining to the execution of the JZ instruction during time T3.

Various solutions have been offered to limit the amount of aliasing in a branch history table 223. One technique drastically increases the size of the branch history table 223. Another technique causes the branch history table 223 to function similar to a memory cache: only one branch instruction is allowed to access and update an entry in the branch history table 223. As a result, prediction accuracies are improved for those instructions fortunate enough to have table entries. But, because the table 223 is limited in size, once it 223 is filled, then predictions for subsequent branch instructions cannot be dynamically provided. Fallback predictive techniques must be used that utilize static attributes of branch instructions to predict their outcome. Such static attributes include the test type or branch direction prescribed by the branch instruction. This kind of prediction is called a static prediction because it relies on attributes of a branch instruction that do not change as it is executed in a given application program.

Other approaches to dynamic prediction in the presence of aliasing employ an agree/disagree scheme wherein outcome information is maintained in the branch history table 223 regarding whether a subsequent dynamic prediction should agree or disagree with a static prediction based upon a current resolved outcome. These approaches are described in copending U.S. patent application Ser. No. 09/203,884 now U.S. Pat. No. 6,247,122, entitled METHOD AND APPARATUS FOR PERFORMING BRANCH PREDICTION COMBINING STATIC AND DYNAMIC BRANCH PREDICTORS, having common inventors and having the same assignee, which is hereby incorporated by reference.

There are various techniques used to generate the dynamic branch predictions and static branch predictions. Several of these techniques are described in copending U.S. patent application Ser. No. 09/203,900 now U.S. Pat. No. 6,230,261, entitled METHOD AND APPARATUS FOR PERFORMING BRANCH PREDICTION UTILIZING BRANCH TEST TYPE, having common inventors and having the same assignee, which is hereby incorporated by reference.

In spite of all the approaches discussed above, no unified mechanism has been provided that takes into account the outcome bias of branch instructions to discriminate where their corresponding historical outcome data is recorded in the branch history table 223. In the prior art, if two or more aliased branch instructions have the same outcome bias, then their corresponding branch table entry most probably will provide an accurate dynamic prediction when any of the branch instructions is executed. However, such a case is simply serendipitous. In contrast, the example of FIG. 3 is equally probable where two branch instructions having opposite outcome biases are aliased to the same entry. In this instance, the effects on the execution speed of the microprocessor 200 are more detrimental than if no branch prediction technique had been used in the first place.

One skilled in the art will appreciate that the accuracy of dynamic predictions for aliased branch instructions is seriously affected when those branch instructions do not exhibit a similar outcome bias tendency. This problem can cause extensive performance degradation for an application program having a significant number of branch history table entries.

The present invention overcomes the problem of diminished branch prediction accuracy by providing a mechanism for maintaining historical outcome records for aliased branch instructions that exhibit a bias toward one outcome separate from those aliased branch instructions that exhibit bias toward another outcome. By doing so, the negative effects of aliasing are precluded in a branch history table while the positive effects are preserved. The present invention is more particularly described with reference to FIGS. 4 through 7.

Referring to FIG. 4, a table 400 is presented illustrating empirical conditional branch instruction outcomes as observed in predominant desktop application programs. The table 400 depicts percentages of branches taken for various test types of x86-compatible conditional branch instructions. The table 400 reflects data collected by the present inventors regarding execution of the x86-compatible conditional branch instructions on an x86-compatible microprocessor that is running present day predominant desktop application programs such as Microsoft® Excel, Word, PowerPoint, and Access, as well as Lotus® 1-2-3, WordPerfect®, and Netscape® Communicator. The present inventors have advantageously observed that test types of x86-compatible conditional jump instructions can be categorized according to their exhibited bias toward one outcome or the other.

The test types for which data were collected correspond to x86 architecture test types and are designated in table 400 according to commonly recognized x86 instruction mnemonics. The test types are overflow (JO), not overflow (JNO), carry (JC), not carry (JNC), zero (JZ), not zero (JNZ), carry or zero (J(C|Z)), not carry or zero (JN(C|Z)), sign (JS), not sign (JNS), parity (JP), not parity (JNP), sign and overflow not equal (J(S^O)), sign and overflow equal (JN(S^O)), sign and overflow not equal or zero (J(S^O)|z), sign and overflow equal or zero (JN(S^O)|Z), and CX register zero (JCXZ). The test types correspond to status flag bits in the EFLAGS register of an x86-compatible microprocessor. Although x86-compatible test types are used for this example, it is noted that a given microprocessor may support other test types. One skilled in the art will appreciate that the present invention is not restricted to a particular set of test types as shown in FIG. 4; empirical outcome data for any set of conditional branch instructions may be obtained and evaluated to determine outcome bias.

For each test type, the percentage of branches taken is shown. As may be observed, a first subset of the test types, JNO, JNS and J(C|Z), exhibit a marked bias toward being taken. A second subset of the test types, JNC, JZ, JN(C|Z), J(S^O), and J(S^O)|z, exhibit a marked bias toward being not taken. The remaining test types exhibit a marginal bias toward one outcome or the other. These observations serve as the basis for providing branch predictions in accordance with the present invention.

For example, in one embodiment, the present invention employs two branch history tables: a taken branch history table and a not taken branch history table. Historical outcome data associated with conditional branch instructions exhibiting a bias toward being taken, as presented in the table 400, is recorded in the taken branch history table. Historical outcome data associated with conditional branch instructions exhibiting a bias toward being not taken is recorded in the not taken branch history table. Since conditional branch instructions that exhibit a bias toward being taken are more likely to produce a resolved outcome of taken, it follows then that the outcomes of aliased conditional branch instructions within the taken table will tend to reinforce taken predictions for one another. Similarly, the outcomes of aliased conditional branch instructions within the not taken table will reinforce not taken predictions for one another. Segregating historical outcome records for aliased conditional branch instructions according to their outcome bias tendencies fundamentally produces more accurate predictions.

Figure 5:
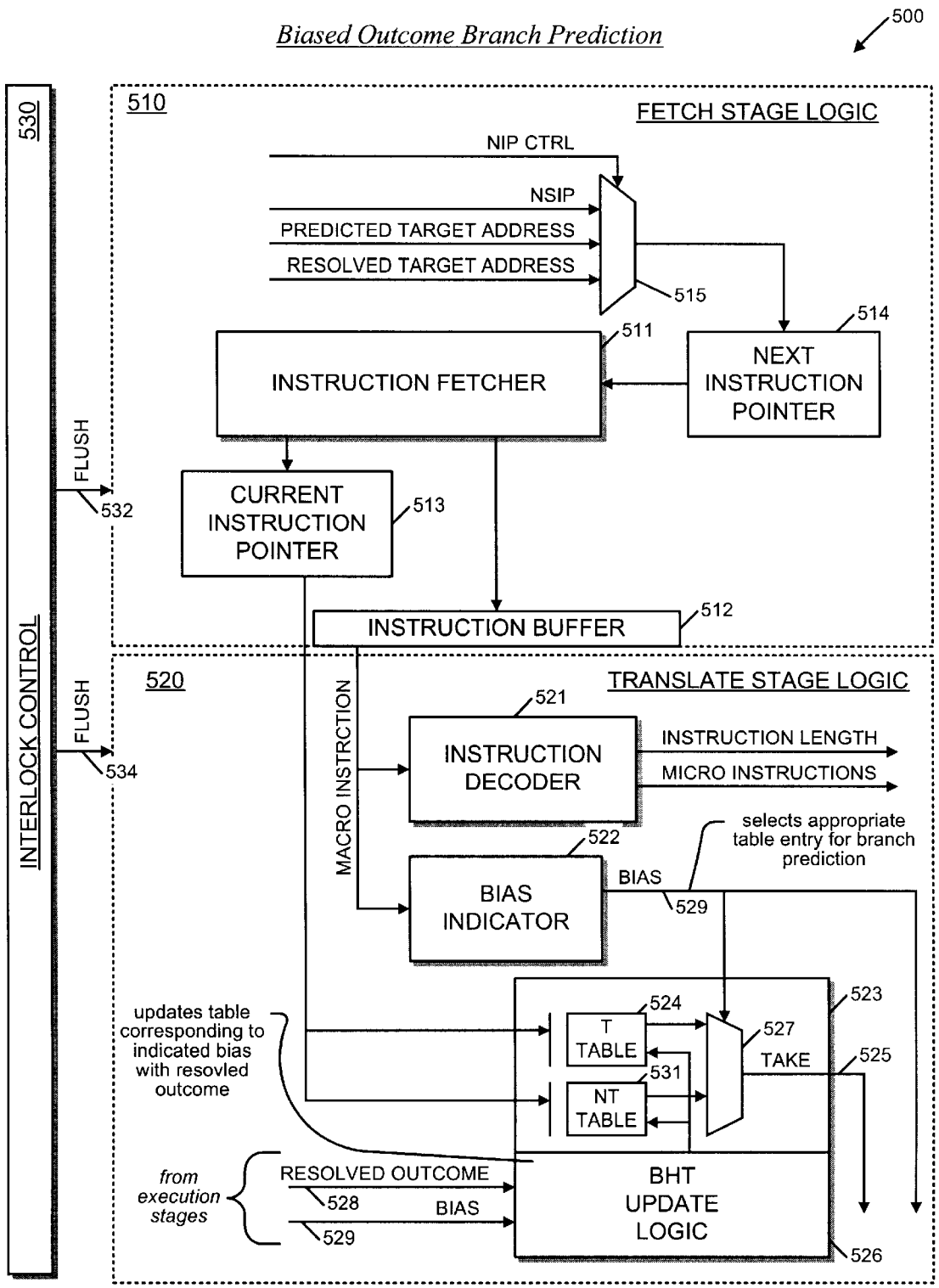
FIG. 5 is a diagram of a portion of a related art pipeline microprocessor according to the present invention for predicting the outcome of branch instructions.

Now referring to FIG. 5, a diagram is presented of a portion of a related art pipeline microprocessor 500 according to the present invention for predicting the outcome of branch instructions. The microprocessor 500 includes fetch stage logic 510, translate stage logic 520, and interlock control 530. For clarity of discussion, remaining stages of the microprocessor 500 are not shown. The microprocessor 500 incorporates elements similar to those described with reference to FIG. 2. Like elements have like references with the hundreds digit replaced by a 5. In addition, the microprocessor 500 according to the present invention includes a bias indicator 522. In place of the branch history table 223, the microprocessor 500 has a split dynamic branch predictor 523 that has branch history tables 524, 531 that are categorized according to outcome biases for conditional branch instructions. In one embodiment, the split dynamic branch predictor 523 has a taken (T) table 524 and a not taken (NT) table 531. In another embodiment, the split dynamic branch predictor 523 has more than two branch history tables that are categorized to finer degrees of outcome bias for conditional branch instructions. The bias indicator 522 provides a bias indication output 529 to the split dynamic branch predictor and also to subsequent stages in the microprocessor 500. In addition, the bias indication output 529 associated with a particular conditional branch instruction is provided to the BHT update logic 526 so that the appropriate branch history table, 524 or 531, can be updated following resolution of the particular conditional branch instruction.

For execution of sequential instructions, the microprocessor 500 according to the present invention functions similar to the microprocessor 200 of FIG. 2. Improved performance is realized for execution of conditional branch instructions. The present invention can be employed in a microprocessor 500 that utilizes any of the dynamic branch prediction schemes alluded to above where less than accurate branch predictions are obtained as a result of conditional branch instructions exhibiting contradictory outcome biases being aliased to the same branch table entry.

When a conditional branch instruction is fetched from the instruction buffer 512, its CIP 513 is provided to the split dynamic branch predictor 523. Low-order bits of the CIP 513 index into both branch history tables 524, 531. Concurrently, the conditional branch instruction itself is provided to the bias indicator 522. The bias indication output 529 is asserted if the conditional branch instruction falls within the taken category of outcome bias. The bias indication output 529 is not asserted if the conditional branch instruction falls within the not taken category of outcome bias. The low-order bits of the CIP 513 cause two historical outcome records to be provided in the split dynamic branch predictor 523: an entry from the T table 524 and an entry from the NT table 531. The bias indication output 529 directs a mux 527 to provide either the entry from the T table 524 or the NT table 531. The selected entry is then evaluated to determine whether a speculative branch should be taken or not. The take output 525 is asserted if a speculative branch is indicated. The take output is not asserted if sequential instruction execution is indicated.

The resolved outcome of a conditional branch instruction is fed back to the BHT update logic 526 via bus 528 so that the resolved outcome can be added to the historical outcome record in the branch history table to which the conditional branch instruction was mapped. The proper branch history table is selected by the state of the bias indication output 529 that corresponds to the conditional branch instruction. If the conditional branch instruction is in the taken bias category, then the T table 524 is selected for update. If the conditional branch instruction is in the not taken bias category, then the NT table 531 is selected for update. Hence, the outcome results of conditional branch instructions having dissimilar outcome biases are precluded from diminishing the accuracy of entries in the split dynamic branch predictor 523. Thus, the negative effects of aliasing are reduced in a microprocessor 500 according to the present invention. As a result, the overall accuracy of branch predictions is improved, thus boosting the performance of the microprocessor 500. How performance is boosted in the presence conditional branch instructions exhibiting contradictory outcome biases is more specifically described with reference to FIG. 6.

Figure 6:
FIG. 6 is a table illustrating the effects of predicting branches with the microprocessor of FIG. 5.

Referring to FIG. 6, a table 600 is provided illustrating the effects of predicting branches with the microprocessor 500 of FIG. 5. The table 600 traces the execution of two x86-compatible conditional branch instructions: jump if sign flag not set, designated by JNS, and jump if zero flag set, designated by JZ. As discussed with reference to FIG. 4, the JNS instruction exhibits a bias toward being taken and the JZ instruction exhibits a bias toward being not taken. Execution of the instructions are traced with respect to times T1 through T4, time T4 being later than time T1. Column headings and contents in the table 600 correspond to headings and contents as described with reference to FIG. 3 with the exception that the state of the bias indication output 529 is portrayed in the column entitled Bias Indication.

At time T1, conditional branch instruction JNS is provided to the translate stage logic 510. The low-order bits of the CIP 513 are used to access two corresponding branch history table entries for the JNS instruction: one from the T table 524 and one from the NT table 531. In addition, the JNS instruction itself is provided to the bias indicator 522 and a resulting bias indication output 529 indicates an outcome bias of taken (T). Consequently, the bias indication output 529 directs the mux 527 in the split dynamic branch predictor 523 to evaluate the entry from the T table 524. The T table 524 provides a taken prediction and the microprocessor 500 is thus directed to take a speculative branch to a branch target instruction associated with the JNS instruction. Resolution of the JNS instruction prior to time T2 confirms the branch prediction. Following resolution of the JNS instruction, the resolved outcome, taken (T), is provided to the BHT update logic 226 so that the branch history table entry corresponding to JNS can reflect the recent outcome. In the branch prediction scheme used in this example, such an update will result in a dynamic branch prediction of taken (T) the next time the corresponding branch history table entry is accessed.

At time T2, conditional branch instruction JZ is provided to the translate stage logic 520. Low-order bits of its CIP 513 are provided to the split dynamic branch predictor 523 in addition to the instruction itself being provided to the bias indicator 522. Because the low-order address for the JZ instruction is the same as that for the JNS instruction, the JZ instruction is aliased to the JNS instruction. But, because the JZ instruction exhibits an outcome bias toward being not taken, the bias indication output 529 directs the mux 527 to select a historical outcome record from the NT table 531 rather than the T table 524. As a result, the NT table 531 provides a dynamic branch prediction of not taken (NT). Thus, in contrast to the example of FIG. 3, the microprocessor 500 according to the present invention is directed to continue sequential instruction execution. Resolution of the JZ instruction prior to time T3 confirms the branch prediction obtained from the NT table 531. Following resolution of the JZ instruction, the resolved outcome, not taken (NT), is provided to the BHT update logic 526 along with the bias indication output 529 so that the branch history table entry corresponding to the JZ instruction can reflect the recent outcome.

At time T3, conditional branch instruction JZ is again provided to the translate stage logic 520. Its corresponding entry in the NT table 531 is accessed, and because the entry contents indicate that the branch will be not taken, the take branch output signal 525 is not asserted. Consequently, the microprocessor 500 is directed to continue execution of sequential instructions. Resolution of the JZ instruction prior to time T4 confirms the previous prediction. Following resolution of the JZ instruction, the resolved outcome, not taken (NT), is provided to the BHT update logic 526 along with the bias indication output 529 so that the branch history table entry corresponding to the JZ instruction can reflect the recent outcome. The BHT update logic 526 updates the corresponding branch history table entry in the NT table 531 with the resolved outcome, NT.

At time T4, conditional branch instruction JNS is provided again to the translate stage logic 520. The bias indication output 529 directs the split dynamic branch predictor to select the historical record from the T table 524. As such, because the contents of the T table entry do not reflect the outcome of the previously executed JZ instruction, a taken prediction is made in accordance with the resolved outcome obtained during time T1. Hence, the microprocessor 500 continues execution of sequential instructions. Yet, when the JNS instruction is resolved, the not taken prediction is contradicted and the pipeline must be flushed and refilled with instructions beginning with the target instruction prescribed by the JNS instruction.

In contrast to the similar example discussed with reference to FIG. 3, the microprocessor 500 according to the present invention does not require that clock cycles be consumed with pipeline flushes for aliased conditional branch instructions having tendencies toward opposite outcomes. Because their historical outcome records are segregated, the outcome of one instruction does not influence the outcome of the other instruction.

It is noted that to implement a two-table design would require twice the number of storage bits over a single table design. However, indexing logic and record retrieval logic can be shared between multiple history tables. One skilled in the art is aware that some branch history tables in conventional microprocessors comprise multiple bits for each outcome record. In an alternate embodiment of the present invention, the two-table scheme can be implemented by devoting half the number of bits in a conventional scheme to a record for taken bias and the other half for not taken bias.

Figure 7:
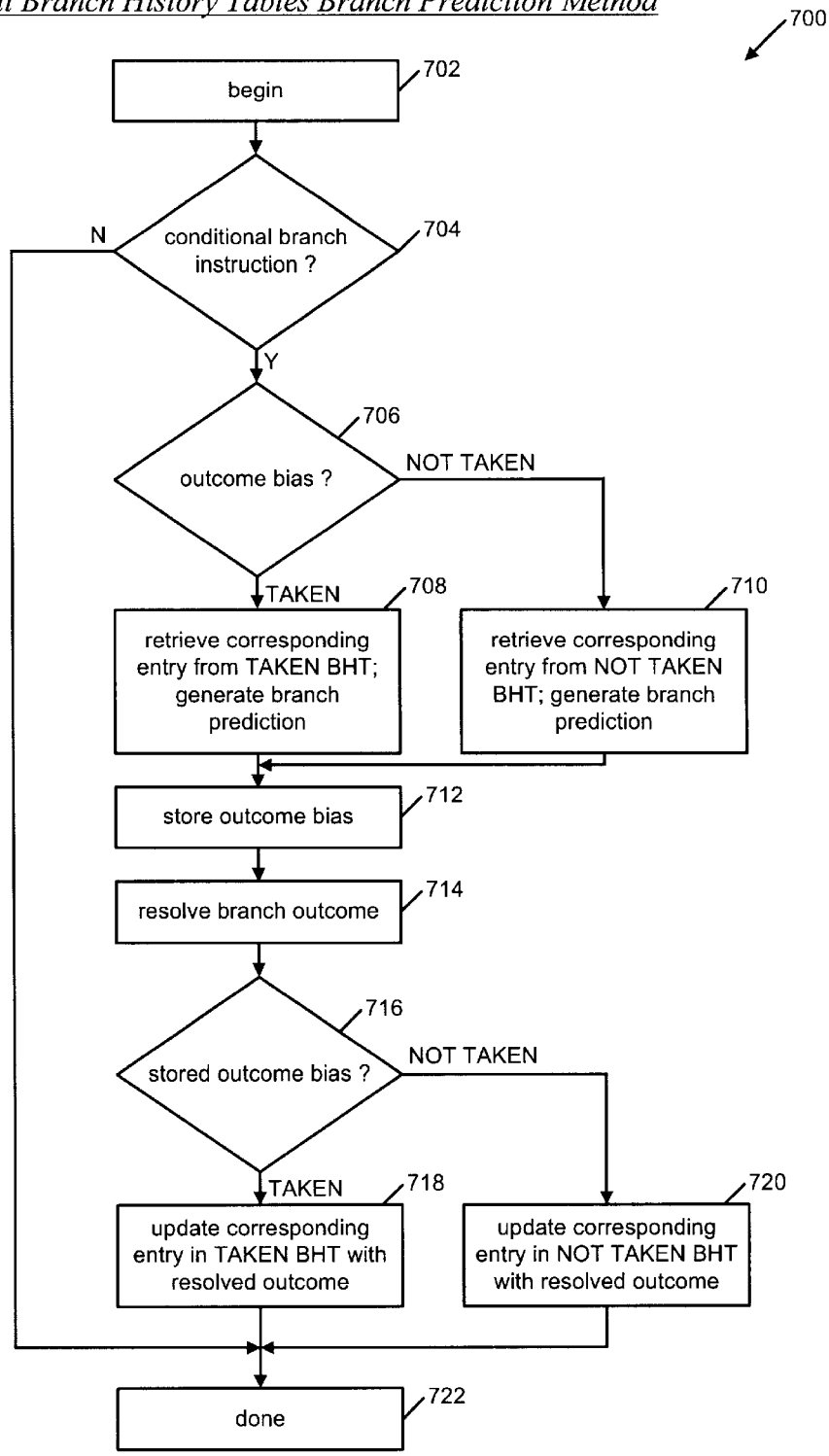
FIG. 7 is a flow chart of a method according to the present invention for predicting the outcome of branch instructions in a pipeline microprocessor.

Now referring to FIG. 7, flow chart 700 is presented of a method according to the present invention for predicting the outcome of branch instructions in a pipeline microprocessor.

Flow begins at block 702 where an instruction is fetched from an instruction buffer and provided to translate stage logic in the microprocessor. Flow then proceeds to decision block 704.

At decision block 704, the instruction is evaluated to determine if it is a conditional branch instruction. If it is, then flow is directed to decision block 706. If it is not a conditional branch instruction, then no branch prediction is required. Thus, flow proceeds to block 722.

At decision block 706, the conditional branch instruction is evaluated to determine its outcome bias. If it is biased toward a TAKEN outcome, then flow proceeds to block 708. If it is biased toward a NOT TAKEN outcome, then flow proceeds toward block 710.

At block 708, because it has been determined that the conditional branch instruction exhibits a TAKEN bias, a corresponding entry in a TAKEN branch history table is retrieved and evaluated. As a result of the evaluation, a branch prediction is generated for the conditional branch instruction. Flow then proceeds to block 712.

At block 710, because it has been determined that the conditional branch instruction exhibits a NOT TAKEN bias, a corresponding entry in a NOT TAKEN branch history table is retrieved and evaluated. As a result of the evaluation, a branch prediction is generated for the conditional branch instruction. Flow then proceeds to block 712.

At block 712, the outcome bias of the conditional branch instruction, TAKEN or NOT TAKEN, is stored for later reference. Flow then proceeds to block 714.

At block 714, the conditional branch instruction executed such that its outcome is resolved. Flow then proceeds to decision block 716.

At decision block 716, the outcome bias of the conditional branch instruction is recalled in order to determine which branch history table to update. If the outcome bias is TAKEN, then flow proceeds to block 718. If the outcome bias is NOT TAKEN, then flow proceeds to block 720.

At block 718, because the outcome bias of the conditional branch instruction is TAKEN, the corresponding entry in the TAKEN branch history table is updated to reflect the resolved outcome obtained in block 714. Flow then proceeds to block 722.

At block 720, because the outcome bias of the conditional branch instruction is NOT TAKEN, the corresponding entry in the NOT TAKEN branch history table is updated to reflect the resolved outcome obtained in block 714. Flow then proceeds to block 722.

At block 722, the method completes.

Although the present invention and its objects, features, and advantages have been described in detail, other embodiments are encompassed by the invention. For example, the present invention has been particularly characterized in terms of a biased indicator that bases its prediction on outcome data corresponding to test type. Yet, there are other operands within a conditional branch instruction whose state may yield more accurate indications of outcome bias. For example, many conditional branch instructions are more biased toward one outcome if the branch is backwards, i.e., the branch target instruction is stored in a lower memory address than the conditional branch instruction. Such indication can be obtained by evaluating the conditional branch instruction when it is provided to the bias indicator. The relevant aspects of the present invention include such evaluations and will thus provide a bias indication by evaluating other aspects of the conditional branch instruction as well as test type.

In the future, other statistical indicators may become relevant to determining if a conditional branch instruction has a particular outcome bias and to predicting the outcome given those indicators. For example, the particular application program that is executing on a microprocessor may be relevant. The present invention comprehends such indications. Indeed, the bias indication obtained may be based upon a number of these indicators outside of contents of a dynamic branch history table.

Furthermore, although one embodiment of the invention is described with respect to an x86-compatible microprocessor, it will be clear to one skilled in the art that the present invention may be applied to other microprocessor architectures which do not utilize the x86 instruction set. Therefore, the present disclosure is not intended to be limited to application within the x86 architecture. In addition, although embodiments are described which categorize outcomes into TAKEN and NOT TAKEN categories, the present invention is not limited to the particular subsets indicated. Rather, the present invention is directed broadly to categorization of outcome bias to support more accurate dynamic branch predications in the presence of aliasing based upon useful criteria defined by a designer, in particular the outcomes of conditional branch instructions when executed within predominately used application programs on a given microprocessor.

Those skilled in the art should appreciate that they can readily use the disclosed conception and specific embodiments as a basis for designing or modifying other structures for carrying out the same purposes of the present invention without departing from the spirit and scope of the invention as defined by the appended claims.

What is claimed is:

1. A branch prediction apparatus, comprising:
    a first table, for storing first branch histories for a first set of branch instructions, wherein said first branch instructions are categorized within said first table according to a first outcome bias;
    a second table, for storing second branch histories for a second set of branch instructions, wherein said second branch instructions are categorized within said second table according to a second outcome bias; and
    selection logic, coupled to said first and second tables, for selecting a particular branch history from either of said first or second tables.

2. The branch prediction apparatus as recited in claim 1, wherein said first and second branch instructions are categorized according to said first and second outcome biases to support more accurate dynamic branch predictions in the presence of aliasing.

3. The branch prediction apparatus as recited in claim 2, wherein said first and second branch instructions are categorized according to said first and second outcome biases according to useful criteria defined by a designer.

4. The branch prediction apparatus as recited in claim 3, wherein said particular branch history comprises a plurality of bits indicating whether previous corresponding branch outcomes were taken or not taken.

5. The branch prediction apparatus as recited in claim 1, wherein said selection logic generates a branch prediction output based upon contents of said particular branch history.

6. The branch prediction apparatus as recited in claim 5, wherein, if said branch prediction output indicates that a branch is to be taken, then a speculative branch to a branch target address is executed.

7. The branch prediction apparatus as recited in claim 6, wherein, if said branch prediction output indicates that a branch is to be not taken, then said speculative branch to said branch target address is not executed, but rather sequential instruction execution is continued.

8. An apparatus in a microprocessor for performing branch prediction, comprising:
    a bias indicator, configured to receive a branch instruction, and to provide an output indicating a particular outcome bias category for said branch instruction; and
    a dynamic branch predictor, coupled to said bias indicator, configured to receive said output, and to predict an outcome for said branch instruction based upon contents of an entry in a particular branch history table, wherein said particular branch history table corresponds to said particular outcome bias category; and
    a plurality of branch history tables, coupled to said dynamic branch predictor, each of said plurality of branch history tables corresponding to each of a plurality of outcome bias categories, wherein said particular branch history table is one of said plurality of branch history tables, and wherein said particular outcome bias category is one of said plurality of outcome bias categories.

9. The apparatus as recited in claim 8, wherein said particular outcome bias category is one of a plurality of outcome bias categories, wherein each of said plurality of outcome bias categories is categorized to support more accurate dynamic branch predications in the presence of aliasing.

10. The apparatus as recited in claim 9, wherein said plurality of outcome bias categories is categorized according to useful criteria defined by a designer.

11. The apparatus as recited in claim 10, wherein said plurality of outcome bias categories comprise a taken category and a not taken category.

12. The apparatus as recited in claim 11, wherein said bias indicator provides said output as a function of a branch type and a displacement, said branch type and said displacement being prescribed by said branch instruction.

13. The apparatus as recited in claim 8, wherein an instruction pointer associated with said branch instruction is employed to select said entry.

14. The apparatus as recited in claim 8, wherein, if said outcome is predicted as taken, then the microprocessor executes a speculative branch to a branch target address.

15. The apparatus as recited in claim 14, wherein, if said outcome is predicted as not taken, then the microprocessor does not execute said speculative branch to said branch target address, but rather continues sequential instruction execution.

16. The apparatus as recited in claim 8, further comprising:
    branch history update logic, coupled to said split dynamic branch predictor, configured to update said entry following resolution of said branch instruction, wherein said output is employed to distinguish said entry in said particular branch history table from a different entry in a different branch history table.

17. A branch prediction mechanism for performing branch predictions in a microprocessor, comprising:
    a bias indicator, configured to receive a branch instruction from an instruction buffer, and to provide an output indicating a particular outcome bias category for said branch instruction, said particular outcome bias category is one of a plurality of outcome bias categories;
    a dynamic branch predictor, coupled to said bias indicator, configured to receive said output, and to predict an outcome for said branch instruction based upon contents of an entry in a particular branch history table, wherein said particular branch history table is one of a plurality of branch history tables, and wherein said particular branch history table corresponds to said particular outcome bias category, said particular outcome bias category being defined based upon useful criteria to support more accurate dynamic branch predictions; and
    branch history update logic, coupled to said dynamic branch predictor, configured to update said entry following resolution of said branch instruction.

18. The branch prediction mechanism as recited in claim 17, wherein said bias indicator provides said output as a function of a branch type and a displacement, said branch type and said displacement being prescribed by said branch instruction.

19. The branch prediction mechanism as recited in claim 17, wherein, if said outcome is predicted as taken, then the microprocessor executes a speculative branch to a branch target address.

20. The branch prediction mechanism as recited in claim 19, wherein, if said outcome is predicted as not taken, then the microprocessor does not execute said speculative branch to said branch target address, but rather continues sequential instruction execution.

21. The branch prediction mechanism as recited in claim 17, wherein said branch history update logic comprises:
   a first input, configured to receive a resolved outcome for said branch instruction indicating whether a branch was taken or not; and
   a second input, coupled to said first input, configured to receive an outcome bias category signal indicating said particular outcome bias category, wherein said outcome bias category signal directs said branch history update logic to update said particular branch history table.

22. A branch prediction apparatus, comprising:
   a bias indicator, configured to provide an output indicating a particular outcome bias category for a particular branch instruction; and
   a dynamic branch predictor, coupled to said bias indicator, configured to direct a next instruction pointer to indicate a next sequential instruction address or a branch target address, said split dynamic branch predictor comprising:
      a plurality of branch history tables, each of said plurality of branch history tables configured to receive an instruction pointer and to maintain corresponding branch outcome data, wherein a particular branch history table contains particular branch outcome data associated with said particular outcome bias category, wherein said particular outcome bias category is established to support more accurate dynamic branch predictions in the presence of aliasing.

23. The branch prediction mechanism as recited in claim 22, wherein said particular outcome bias category is either a taken category and a not taken category.

24. The branch prediction mechanism as recited in claim 22, wherein said bias indicator provides said output as a function of a branch type and a displacement, said branch type and said displacement being prescribed by said particular branch instruction.

25. The branch prediction apparatus as recited in claim 22, further comprising:
   branch history update logic, coupled to said split dynamic branch predictor, configured to update entries in said plurality of branch history tables following resolution of branch instructions, said branch history update logic comprising:
      a first input, configured to receive a resolved outcome indicating whether a branch was taken or not; and
      a second input, coupled to said first input, configured to receive an outcome bias category signal indicating an outcome bias category, wherein said outcome bias category signal directs said branch history update logic to update a specific branch history table.

26. A method for performing branch prediction in a microprocessor, comprising:
   maintaining a plurality of branch history tables containing historical outcome records for branch instructions, each of the plurality of branch history tables being indexed by an instruction pointer;
   employing a specific outcome bias category to identify a specific branch history table for a specific branch instruction, wherein said specific outcome bias category is defined based upon criteria to support more accurate branch predictions; and
   predicting an outcome of the specific branch instruction based upon contents of a specific historical outcome record corresponding to the specific outcome bias category.

27. The method as recited in claim 26, wherein said maintaining comprises:
   resolving outcomes of branch instructions, each of the branch instructions being associated with an outcome bias category; and
   selectively updating historical data records in the plurality of branch history tables as distinguished by outcome bias category.

28. The method as recited in claim 26, wherein said predicting comprises:
   evaluating contents of the specific historical outcome record to determine if it is more likely that a branch will be taken or not taken;
   generating a predicted outcome signal for the specific branch instruction in accordance with said evaluating.

29. The method as recited in claim 28, wherein a test type prescribed by the branch instruction is used by said providing to determine the corresponding outcome bias category.

30. The method as recited in claim 29, wherein a displacement prescribed by the branch instruction is used by said providing to determine the corresponding outcome bias category.

* * * * *